July 20, 1965 M. J. STURTEVANT ETAL 3,195,948
HEADLINING RETAINER FOR A VEHICLE
Filed March 23, 1962 4 Sheets-Sheet 1
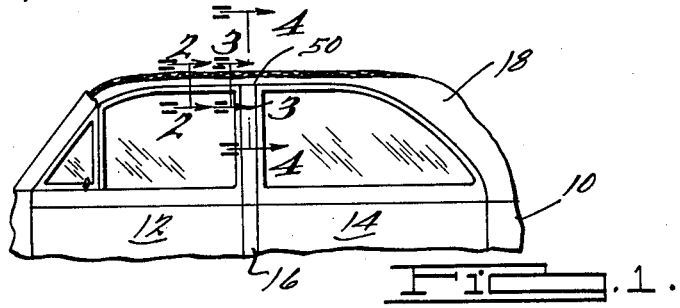
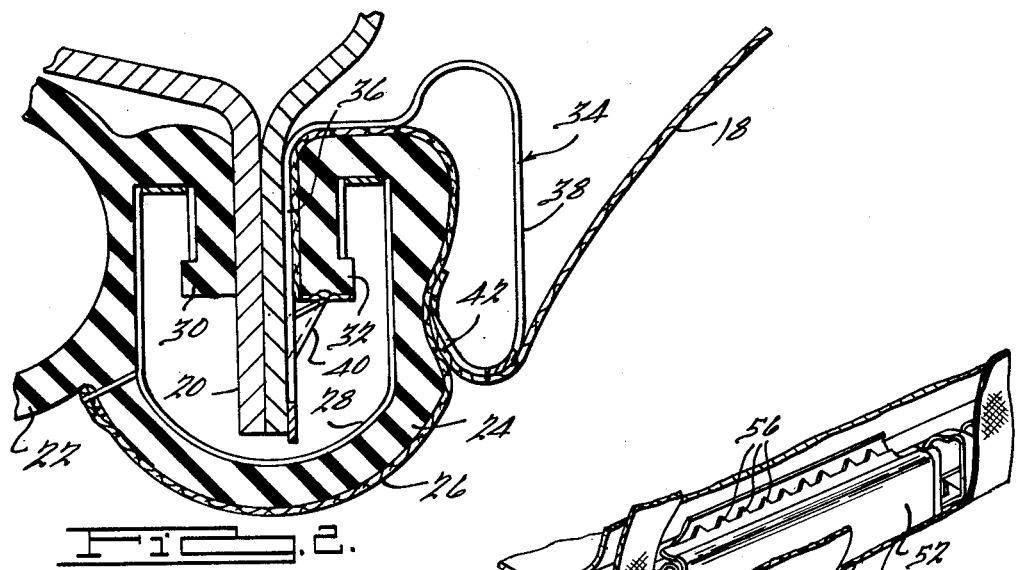
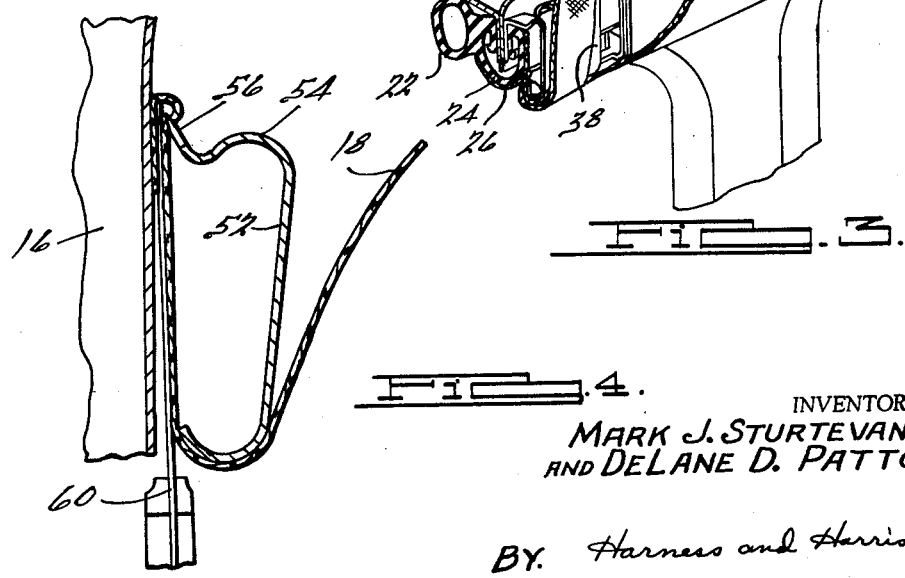
INVENTORS.
MARK J. STURTEVANT
AND DELANE D. PATTON.
BY. Harness and Harris

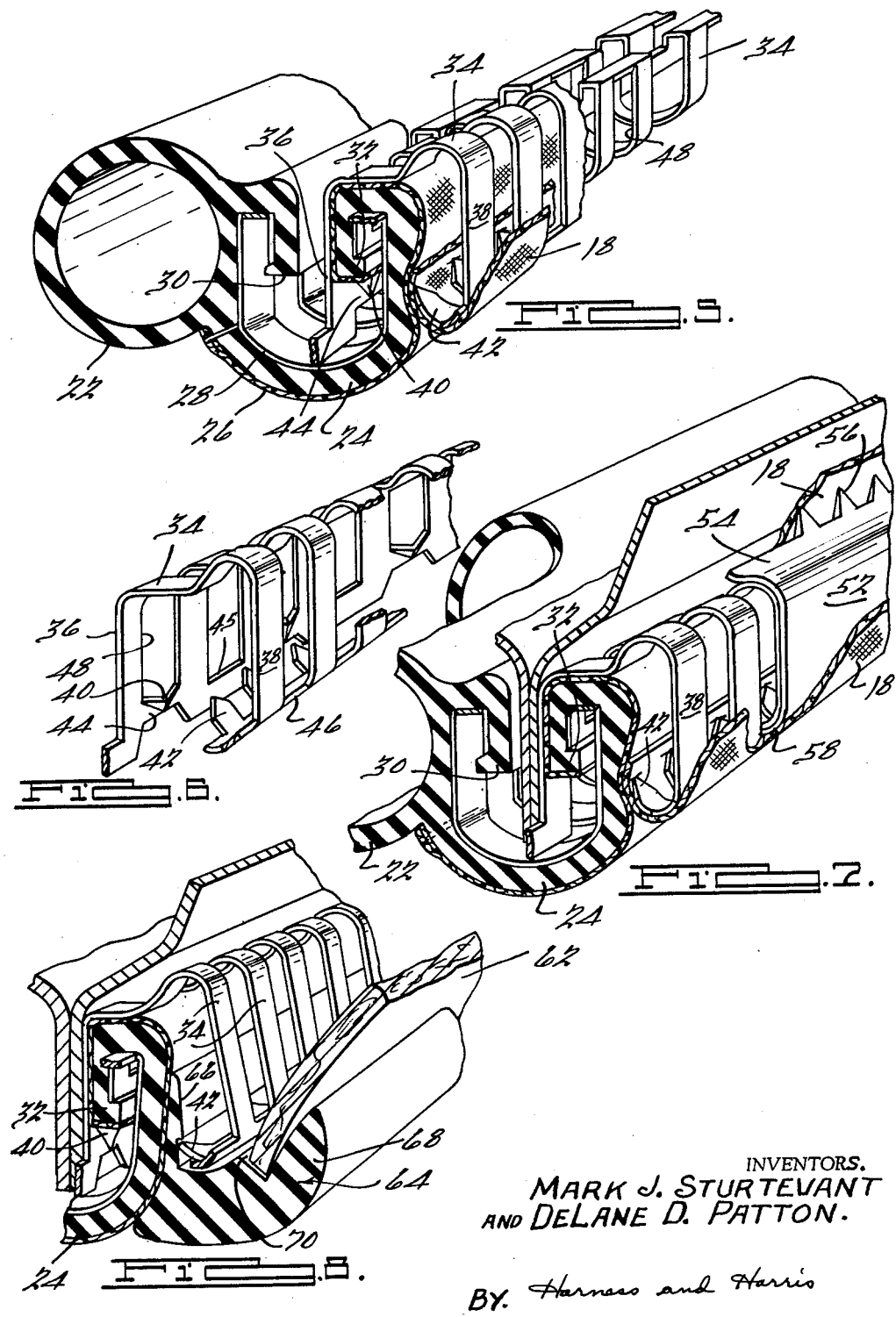

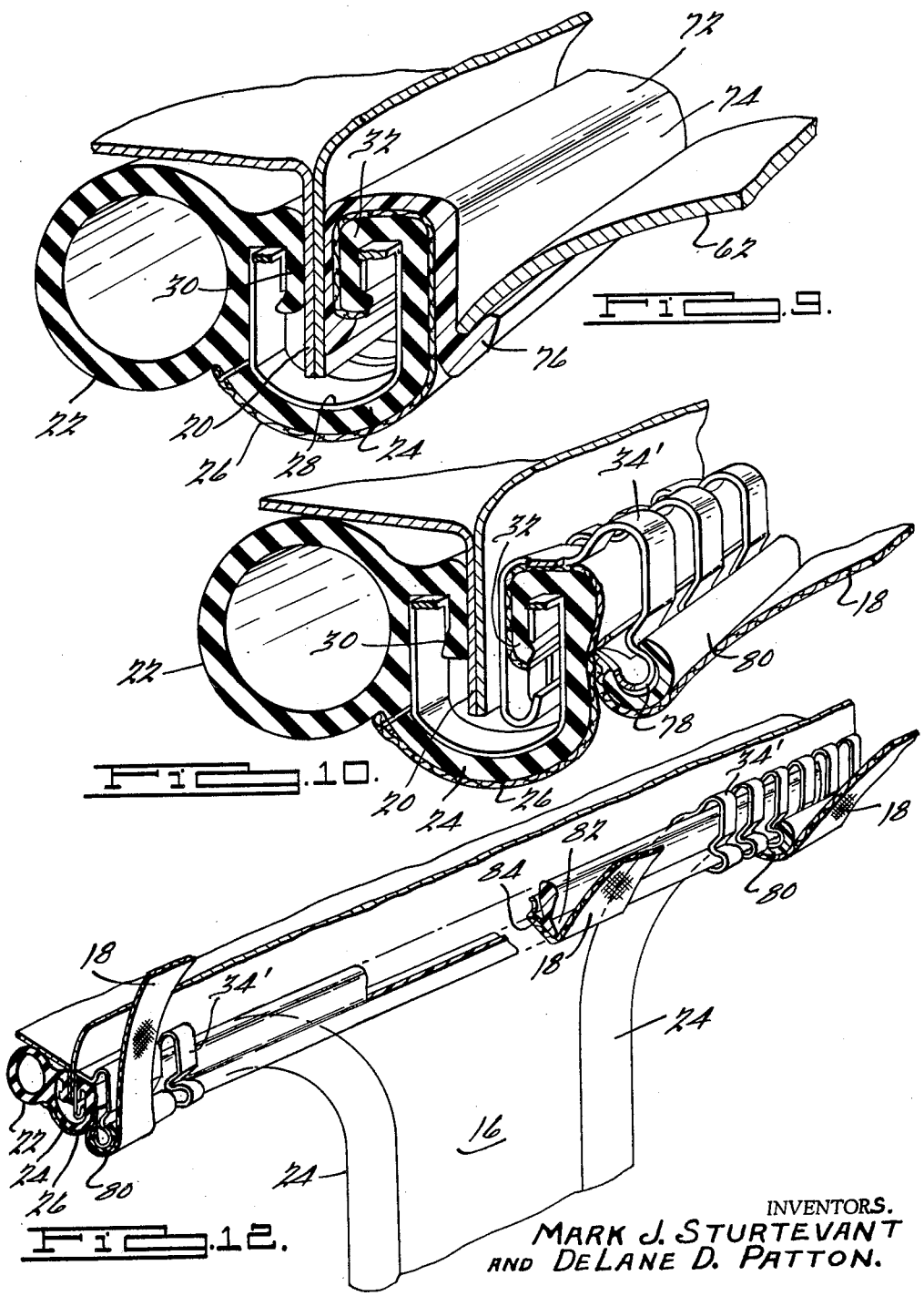

July 20, 1965  M. J. STURTEVANT ETAL  3,195,948
HEADLINING RETAINER FOR A VEHICLE
Filed March 23, 1962  4 Sheets-Sheet 4
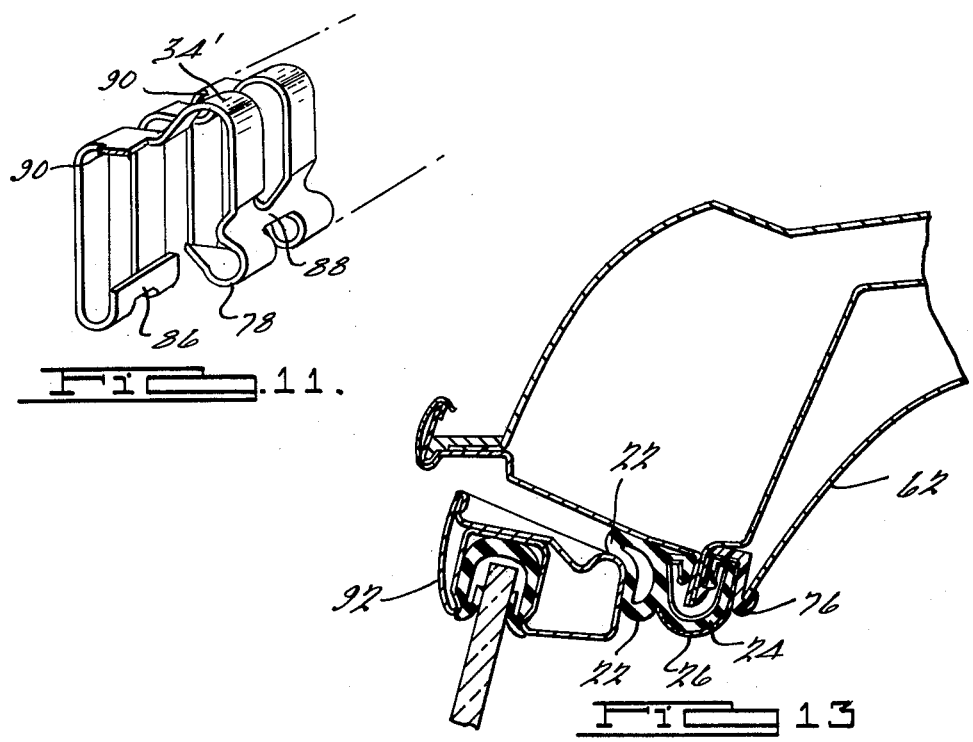
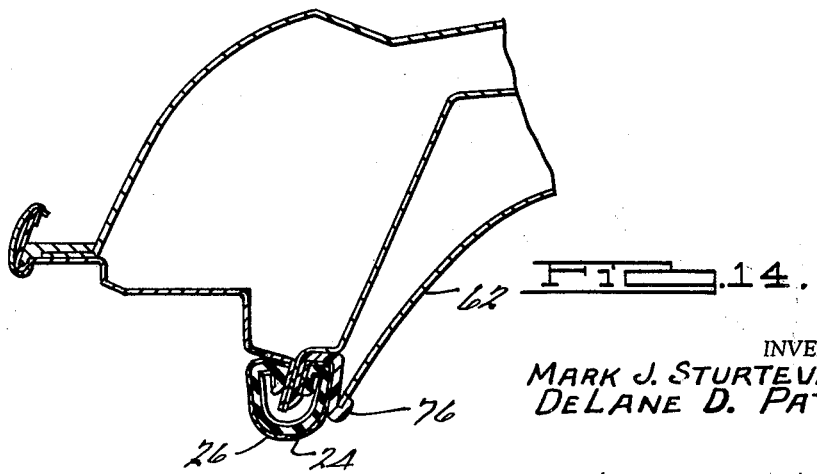
INVENTORS.
MARK J. STURTEVANT AND
DELANE D. PATTON.
BY Harness and Harris 3,195,948
HEADLINING RETAINER FOR A VEHICLE
Mark J. Sturtevant, Grosse Pointe, and De Lane D. Patton, Detroit, Mich., assignors to Chrysler Corporation, Highland Park, Mich., a corporation of Delaware
Filed Mar. 23, 1962, Ser. No. 181,920
17 Claims. (Cl. 296—137)

This invention relates to improvements in retaining means for headlinings of vehicle bodies.

Heretofore, it has been common practice to provide separate means on the interior of an automobile body to receive the edge portions of headlining material used to cover the interior of the automobile roof. One example of such prior means is shown in U.S. patent to Hathaway No. 2,260,115 and such means contemplates the use of a stamped retainer strip extending throughout substantially the length of the roof. These retainer strips are usually provided with barbs and it is contemplated that the headlining material be forced between the member and the roof for retention by the barbs. Such retainer strips require separate tooling for the retainer strips carried by the left and right sides of the body. In addition, each vehicle body style requires a different length and contour for its retainer strips. It is thus seen that the tooling cost for such a simple device is relatively high and there is labor required in securing them to the interior of the vehicle body as well as the subsequent labor of securing the headlining material to the retainer strip.

It is a principal object of this invention to provide flexible means for retaining the headlining so designed that it may be manufactured in continuous strip form and cut to length to suit the individual requirements of the vehicle body. A flexible spring steel carrier, as will be described herein, for retaining headlining may be made continuously and cut to length and then coiled until used. In addition to a saving in tooling cost, as mentioned above, there is a shipping and storage saving.

It is also an important object of this invention to support the headlining on a windcord or other border member normally provided on a vehicle body.

It is a further object of the invention to secure the headlining material to such windcord or border member directly so that no misalignment or unsightly gaps can appear therebetween. Such might be the case where, as in the prior art, the windcord or the like is secured to the metal body and the headlining is secured to a retainer which in turn is secured to the body. Improper securement of either of these parts produces the possibility of an error and an unsightly gap.

It is an additional object of the invention to provide headlining retention means that is made of thin spring steel wherein tooling considerations make the maintenance of sharp barbs quite practical. The dies may be of any convenient size and the material from which the barbs are formed is thin thereby contributing to the sharpness thereof in one direction. It has been found that with the long retainer strips previously secured to the automobile roof such as the retainer strips 21 of the above mentioned Patent 2,260,115 tooling revision to maintain sharpness of the barbs is a major problem with a die of that length operating on relatively thick material.

It is also an object of the invention to provide means for supporting a stiff panel type of headlining on a windcord of an automobile body.

It is an additional object of the invention to provide means for bridging the space between body openings, such as at the upper portion of the post separating the front door from the rear door of a conventional sedan model automobile.

In the drawings:
FIG. 1 is a fragmentary view of the inside of a vehicle body;
FIG. 2 is a vertical section taken on the line 2—2 of FIG. 1;
FIG. 3 is a vertical section taken on the line 3—3 of FIG. 1;
FIG. 4 is a vertical section taken on the line 4—4 of FIG. 1, and illustrates the retention of a soft headlining material in a region of an automobile body where no windcord is provided;
FIG. 5 is a fragmentary perspective view of the windcord and headlining retention device illustrated in FIG. 2;
FIG. 6 is a fragmentary perspective view of the spring steel retention device illustrated in FIG. 5;
FIG. 7 is a fragmentary perspective view of the assembly illustrated in FIG. 3;
FIG. 8 is a fragmentary perspective view of a modified form of the invention for the retention of a hard headlining material;
FIG. 9 is a fragmentary perspective view of another modification of the invention for the retention of hard headlining material;
FIG. 10 is a fragmentary perspective view of a further modified form of the invention;
FIG. 11 is a fragmentary perspective view of the spring steel retention device illustrated in FIG. 10;
FIG. 12 is a fragmentary perspective view of a portion of an automobile illustrating our invention bridging the post between front and rear doors of an automobile;
FIG. 13 is a vertical sectional view illustrating one form of the invention; and
FIG. 14 is a vertical sectional view illustrating the invention applied to an automobile which does not incorporate the door sealing weatherstrip illustrated in some other figures herein.

A portion of an automobile body 10 is illustrated in FIG. 1 and it will be observed that a front door 12 and a rear door 14 are separated by a post 16 generally known in the trade as a "B" post. The upper edges of the front door 12 and the rear door 14 terminate in the general proximity of headlining material 18 which may be a soft cloth or a hard material, all as is well known in the art.

Heretofore, it has been conventional practice to secure the headlining to the body 10 on each side thereof by means of a single stamped headlining retention device. One example of which is shown in U.S. Patent 2,260,115 which issued October 21, 1941, to E. R. Hathaway.

In view of the fact that it is also conventional practice to have border material such as a windcord or weatherstrip around the periphery of the body opening it is proposed to utilize such windcord or other border material and its supporting apparatus as means for supporting the headlining material.

Referring to FIGS. 2 and 5 it will be seen that the vehicle body 10 is provided with a flange of double thickness generally known in the trade as a fence 20. It is common practice to provide such a fence around the periphery of a body opening such as the openings provided for doors 12 and 14. It is also known in the trade to use such fence constructions to support combined windcord and weatherstrip devices and one example of such a device is shown in U.S. Patent 2,554,452 which issued May 22, 1951, to T. J. R. Bright.

The combination windcord and weatherstrip includes a weatherstrip portion 22 which preferably has the form of a tube of rubber or the like and a windcord portion 24 which has a rubber portion covered with a decorative fabric 26. This assembly is retained on the fence 20 by means of a clip 28 which has a generally U-shape adapted to straddle the fence 20 and to compress depending legs 30 and 32 of the weatherstrip and windcord respectively into firm retention laterally against fence 20. The clip 28 is preferably formed of metal and provided with lateral slotted portions to impart flexibility thereto so that the combination windcord and weatherstrip assembly may be secured to fence 20 even though the latter curves and has corners.

In the form of the invention illustrated in FIGS. 2 and 5 a supplemental metallic clip device 34 is provided with a generally U-shaped cross section defining a first depending leg 36 and a second depending leg portion 38. The depending leg portion 36 is forced between fence 20 and depending portion 32 of the windcord and barbs 40 are preferably provided to further insure the retention of depending leg portion 36 in its assembled condition by virtue of engagement of the barbs with depending leg portion 32 of the windcord 24. The depending leg portion 38 of clip 34 is provided with inwardly directed portions 42 having barbed ends located in close proximity to the fabric 26 of windcord 24 to accommodate the reception of headlining material 18 therebetween. The headlining material 18 may be forced into the position illustrated in FIGS. 2 and 5 by means of a tool such as a putty knife and the barbed ends 42 of clip 34 will retain the headlining in its assembled position.

The clip 34 is preferably formed as illustrated in FIGS. 5 and 6 from stamped metal having the cross section described above and is preferably formed as a series of U-shaped sections interconnected by bridging portions 44, 45 and 46 so that the clip 34 has a plurality of slotted areas 48 accommodating relative movement between adjacent U-shaped portions thereby giving the clip sufficient flexibility to accommodate its installation around corners and the like on the vehicle and similarly to accommodate rolling of the clip either alone or in assembled condition with the windcord and weatherstrip into coiled formation for shipment.

FIGS. 3, 4 and 7 illustrate a refinement provided to accommodate the headlining at its intersection with "B" post 16. It is apparent that the combined windcord and weatherstrip assembly previously referred to herein is installed on fence 20 around the door openings, but there is still a short span designated by the numeral 50 in FIG. 1 where the combined windcord and weatherstrip is absent and other means must be provided for trimming the headlining. A short metallic member 52 is provided. It has a generally C-shaped cross section with an upper curved portion 54 snapped over the upper surface of headlining clip 34 and provided with a plurality of upstanding tangs 56. It is also provided with a lower curved portion 58 which is snapped over the base of headlining clip 34. This is illustrated in FIG. 3 and it will be seen that the member 52 spans the space 50 and is supported by the clips 34 of adjacent doors. Thus, when one refers to FIG. 3 and realizes that the combined windcord and weatherstrip assembly will drop to a vertical position as it goes down the edge of the "B" post 16 it will be appreciated that the member 52 will carry on in a substantially horizontal direction and bridge the upper edge of the "B" post. The headlining material 18 is forced behind member 52 by a tool such as a putty knife 60, as illustrated in FIG. 4, and becomes impaled upon barbs 56.

Another form of the device is illustrated in FIG. 8. This figure generally resembles FIG. 5 and similar reference numerals are used therein. The principle difference, however, is that instead of a soft headlining 18 being impaled upon the barbs 42 of clip 34 a hard headlining material 62 such as masonite or other material commonly used in the trade is supported through a trim member 64 by clips 34. The trim member 64 is preferably extruded from plastic and has an upwardly extending notched leg 66 received between barbs 42 of clips 34 and the outer surface of windcord 24. The trim member 64 is also provided with a lateral extension 68 having a notch 70 in which the hard headlining material 62 is retained.

In FIG. 9 a modified form of retention device for hard headlining material is illustrated.

In this form of the invention the clip 34 is omitted and a plastic extrusion 72 of inverted U-shape is assembled over the inner portion of windcord 24 with one leg of the plastic extrusion 72 retained between the depending portion 32 of the windcord and the fence 20. The base of the inverted U-shaped member 72 abuts the upper edge of the windcord 24 and an outer depending portion 74 is provided with a terminal lip 76 which receives the edge of hard headlining material 62 and supports the latter. The plastic extrusion 72 is adapted to span the space above the "B" post 16 in a manner previously described in connection with the metallic member 52 as well as support the headlining over the door openings where the windcord is present.

In some installations it is found that the spaced barbs 42 of the FIG. 5 form of the invention permit soft headlining to have an irregular appearance due to its spaced contact with the clip 34 and as the headlining is under tension it gives a somewhat pleated appearance as it is received into adjacent portions of the clip. In order to provide a higher quality trim edge it is desirable in some installations to provide a clip 34, as shown in FIGS. 10, 11 and 12, with a round depending portion 78 and to snap over the depending rounded portion 78 a plastic extrusion 80 of C-shaped cross section. This gives a uniform trim line so that the soft headlining material 18 will have a smooth appearance when viewed from the interior of the vehicle.

FIG. 11 is a perspective view of the clip 34'. The rounded depending portion 78 is visible therein and it should be noted that U-shaped sections of the clip are alternately joined near the bottom of the dependings legs by bridging members 86 and 88 while alternate U-shaped clip portions are joined near the base of the U by bridging portions 90. It has been found that this clip construction gives even greater flexibility than the clip construction illustrated in FIG. 6.

FIG. 12 is a perspective view illustrating another means of bridging the space above the "B" post 16. In this form of the invention a plastic extrusion 82 is provided with an exterior contour closely resembling the interior contour of clip 34' of FIG. 10. A length of this plastic material is inserted inside of clip 34' over the front door and over the rear door and serves to span the gap over "B" post 16. The plastic extrusion 82 is provided with a rearwardly facing lip 84 behind which headlining may be tucked with a putty knife to retain the latter in position. FIG. 12 also illustrates the use of plastic extrusions 80 previously mentioned herein.

FIG. 13 illustrates the device previously described in connection with FIG. 9 and shows its orientation relative to a conventional automobile construction utilizing a hard headlining material 62. The function of the weatherstrip 22 and the windcord 24 is evident and the parts are oriented relative to other automobile components such as the door 92.

FIG. 14 is a view similar to FIG. 13 and illustrating a similar form of the device used in a different vehicle in which the weatherstrip 22 is absent. It should be appreciated that some automobiles are constructed with weatherstrip 22 surrounding the door opening and carried by the body and as illustrated in FIGS. 5, 7, 9, 10, 12 and 13. It should be understood, however, that it is also conventional practice in the trade to construct some automobiles with rubber weatherstrip around the periphery of the door itself rather than around the door opening. In such constructions the various headlining retention devices described herein may be used with the windcord conventionally mounted on the body fence 20 as previously described. FIG. 14 illustrates a hard headlining material 62 supported by a device like that illustrated in FIG. 9, except that the weatherstrip 22 is omitted and presumably a rubber weatherstrip is carried by the door which is not illustrated in this figure. This is mentioned merely to show that any of the forms previously described herein could conveniently be used in the other type of automobile in which the weatherstrip is carried by the door and, therefore, not included in the assembly mounted on the body fence 20.

We claim:

1. An automobile body having a roof with headlining material carried on the underside thereof; said body being further provided with an opening and a flange around a portion of the periphery of such opening, a windcord supported by said flange to conceal the latter and trim the associated portion of the above mentioned opening, and a headlining retention device comprising a series of U-shaped clips each having a first and a second leg with adjacent clips joined together to form a unitary flexible member of substantial length, the first leg of each of said clips being inserted in said windcord for support and the second leg of each of said clips resting against an outer surface of said windcord and receiving edge portions of said headlining material therebetween to support an edge of the headlining material and provide a neat appearing juncture between said windcord and headlining material.

2. An automobile body having a roof with headlining material carried on the underside thereof; said body being further provided with an opening and a flange around a portion of the periphery of such opening, a windcord supported by said flange to conceal the latter and trim the associated portion of the above mentioned opening, and a flexible spring steel headlining retainer of substantial length and having a U-shaped cross section with one leg thereof anchored in said windcord and the other leg thereof provided with a plurality of barbs directed toward an outer surface of said windcord to accommodate insertion and retention of edge portions of said headlining material therebetween and impaling of said headlining on said barbs to provide a neat appearing juncture between said windcord and headlining material.

3. An automobile body having a roof with headlining material carried on the underside thereof; said body being further provided with an opening and a flange around a portion of the periphery of such opening, a windcord supported by said flange to conceal the latter and trim the associated portion of the above mentioned opening, and a flexible spring steel headlining retainer of substantial length and having a U-shaped cross section with one leg thereof retained between said flange and said windcord and the other leg thereof provided with a plurality of barbs directed toward an outer surface of said windcord to accommodate insertion and retention of edge portions of said headlining material therebetween and impaling of said headlining on said barbs to provide a neat appearing juncture between said windcord and headlining material.

4. An automobile body having a roof with headlining material carried on the underside thereof; said body being further provided with an opening and a flange around a portion of the periphery of such opening, a windcord having a slot therein penetrated by said flange to conceal the latter and trim the associated portion of the above mentioned opening, and a flexible spring steel headlining retainer of substantial length and having a U-shaped cross section with one leg thereof received in the above mentioned windcord slot and the other leg thereof provided with a plurality of barbs directed toward an outer surface of said windcord to accommodate insertion and retention of edge portions of said headlining material therebetween and impaling of said headlining on said barbs to provide a neat appearing juncture between said windcord and headlining material.

5. An automobile body having adjacent openings therein separated by a structural element, said body having a roof with headlining material carried on the underside thereof; said body being further provided with a flange around a portion of the periphery of each of said openings, a windcord extending around a substantial portion of the periphery of each of said openings with each of said windcords having a slot therein penetrated by the flange around the associated opening to conceal the latter and trim the above mentioned opening, flexible spring steel headlining retainers of substantial length each having a U-shaped cross section with one leg thereof received in the slot of one of said windcords and the other leg of each of said retainers being provided with a portion located in close proximity to an outer surface of its associated windcord to accommodate insertion and retention of edge portions of said headlining material therebetween to provide a neat appearing juncture between said windcord and headlining material; and a supplemental retainer element carried by the retainers associated with each of said windcords and spanning the above structural element to provide a headlining retention means intermediate the above mentioned openings.

6. An automobile body having a roof with headlining material carried on the underside thereof; said body being further provided with an opening and a flange around a portion of the periphery of such opening, a windcord having a slot therein penetrated by said flange to conceal the latter and trim the associated portion of the above mentioned opening, and a flexible spring steel headlining retainer of substantial length and having a U-shaped cross section with one leg thereof received in the above mentioned windcord slot and the other leg thereof provided with a portion located in close proximity to an outer surface of said windcord to accommodate insertion and retention of edge portions of said headlining material therebetween to provide a neat appearing juncture between said windcord and headlining material.

7. An automobile body having a roof with a stiff headlining panel carried on the underside thereof; said body being further provided with an opening and a flange around a portion of the periphery of such opening, a windcord having a slot therein penetrated by said flange to conceal the latter and trim the associated portion of the above mentioned opening, a flexible spring steel member of substantial length and having a U-shaped cross section with one leg thereof received in the above mentioned windcord slot and the other leg thereof directed toward an outer surface of said windcord, a plastic trim element having a portion retained between said other leg and said windcord, said plastic trim element having a second portion extending inwardly of said body and provided with an upwardly directed notch receiving an edge of the headlining panel to conceal and support the edge of the latter.

8. An automobile body having a roof with a stiff headlining panel carried on the underside thereof; said body being further provided with an opening and a flange around a portion of the periphery of such opening, a windcord having a slot therein penetrated by said flange to conceal the latter and trim the associated portion of the above mentioned opening, means for retaining said headlining panel, said means including an element of substantial length having a portion received in the above mentioned windcord slot, said means also including a portion extending inwardly of said body and provided with an upwardly directed groove receiving an edge of the headlining panel to conceal and support the edge of the latter.

9. An automobile body having a roof with a headlining carried on the underside thereof; said body being further provided with an opening and a border member carried by said body on the periphery of the above mentioned opening, said member having a slot therein, and a flexible spring steel headlining retainer of substantial length and having a U-shaped cross section with one leg thereof received in the above mentioned slot and the other leg thereof provided with means for retaining and supporting said headlining to provide a neat appearing juncture between said border member and said headlining.

10. An automobile body having a roof with a fabric headlining material carried on the underside thereof; said body being further provided with an opening and a border member carried by said body on the periphery of the above mentioned opening, said member having a slot therein, and a flexible spring steel headlining retainer of substantial length and having a U-shaped cross section with one leg thereof received in the above mentioned slot and the other leg thereof provided with a plurality of barbs directed toward an outer surface of said border member to accommodate insertion and retention of edge portions of said headlining material therebetween and impaling of said headlining on said barbs to provide a neat appearing juncture between said border member and headlining material, and a smooth, continuous edge member carried by the lowermost edge of said other leg to assure a smooth lower visible edge on said headlining material.

11. An automobile body having an opening therein and a roof with headlining material carried on the underside thereof; a windcord extending around a substantial portion of the periphery of said opening and having an elongated slot therein, a flexible spring steel headlining retainer of substantial length having a U-shaped cross section with one leg thereof received in the slot of said windcord and the other leg of said retainer being provided with a portion located in close proximity to an outer surface of the windcord to accommodate insertion and retention of an edge portion of said headlining material therebetween to provide a neat appearing juncture between said windcord and headlining material.

12. An automobile body having an opening therein and a roof with headlining material carried on the underside thereof; a windcord extending around a substantial portion of the periphery of said opening and having a slot therein, a flexible headlining retainer of substantial length having a portion received in the slot of said windcord and another portion gripping edge portions of said headlining material.

13. An automobile body having adjacent openings therein separated by a structural element, said body having a roof with headlining material carried on the underside thereof; a windcord extending around a substantial portion of the periphery of each of said openings with each of said windcords having a slot therein, flexible headlining retainers of substantial length respectively having a U-shaped cross section with one leg thereof received in the slot of one of said windcords and the other leg of each of said retainers being provided with a portion located in close proximity to an outer surface of its associated windcord to accommodate insertion and retention of edge portions of said headlining material therebetween to provide a neat appearing juncture between said windcord and headlining material; and a supplemental retainer element of C shaped cross section snapped over the retainers associated with each of said windcords and spanning the above structural element, said supplemental retainer element incorporating headlining retention means to provide support for the headlining in the vicinity of said structural element.

14. An automobile body having adjacent openings therein separated by a structural element, said body having a roof with headlining material carried on the underside thereof; a windcord extending around a substantial portion of the periphery of each of said openings with each of said windcords having a slot therein, flexible headlining retainers of substantial length each having a U-shaped cross section with one leg thereof received in the slot of one of said windcords and the other leg of each of said retainers being provided with a portion located in close proximity to an outer surface of its associated windcord to accommodate insertion and retention of edge portions of said headlining material therebetween to provide a neat appearing juncture between said windcord and headlining material; and a supplemental retainer element carried by the retainers associated with each of said windcords and spanning the above structural element to provide a headlining retention means intermediate the above mentioned openings, said supplemental retainer element comprising a member having end portions respectively nested inside each of said flexible retainers and an intermediate portion spanning said structural element, said intermediate portion being provided with headlining retention means.

15. An automobile body having an opening and a roof with a fabric headlining material carried on the underside thereof; a border member carried by said body on the periphery of the above mentioned opening, said member having a slot therein, and a flexible headlining retainer of substantial length and having a U-shaped cross section with one leg thereof received in the above mentioned slot and the other leg thereof provided with means for retaining headlining between said other leg and a plurality of barbs directed toward said border member, said retainer having an irregular configuration, a smooth, continuous edge member snapped over the lowermost edge of said other leg to assure a smooth edge on said retainer, and a portion of said headlining material covering said retainer and said edge member and extending between said other leg and said border member for retention therebetween.

16. In an automobile body having an opening therein and a roof with headlining material carried on the underside thereof, a windcord extending around a substantial portion of the periphery of said opening and having a slot therein, and retainer means of substantial length having a first portion received in the slot of said windcord and a second portion retaining edge portions of said headlining material.

17. In an automobile body having at least one opening therein and a roof with headlining material carried on the underside thereof, a windcord extending around a substantial portion of the periphery of said opening and having a slot therein, retainer means having a first portion received in said slot and a second portion in close proximity to an outer surface of said windcord, and additional means carried by said second portion about which edge portions of said headlining material are curled in securing said edge portions to said automobile body.

References Cited by the Examiner
UNITED STATES PATENTS

| | | | |
|---|---|---|---|
| 2,746,103 | 5/56 | Bright | 20—69 |
| 2,823,951 | 2/58 | Stahl | 296—137 |
| 3,065,022 | 11/62 | Schutte | 296—137 |

A. HARRY LEVY, *Primary Examiner.*

PHILIP ARNOLD, *Examiner.*